(12) United States Patent
Tandler et al.

(10) Patent No.: US 9,139,182 B2
(45) Date of Patent: Sep. 22, 2015

(54) CONTAINER, PARTICULARLY FOR HYDRAULIC VEHICLE BRAKE SYSTEMS

(75) Inventors: Peter Tandler, Kronberg/Ts. (DE); Werner Krebs, Hambach (DE); Stephan Schlicht, Nauheim (DE); Hans-Jürgen Neumann, Rüsselsheim (DE); Christoph Schiel, Bad Nauheim (DE); Yoji Hiraga, Yokohama (JP)

(73) Assignee: Continental Teves AG & Co. oHG (DE)

( * ) Notice: Subject to any disclaimer, the term of this patent is extended or adjusted under 35 U.S.C. 154(b) by 757 days.

(21) Appl. No.: 13/391,710

(22) PCT Filed: Sep. 15, 2010

(86) PCT No.: PCT/EP2010/063517
§ 371 (c)(1), (2), (4) Date: Aug. 7, 2012

(87) PCT Pub. No.: WO2011/032963
PCT Pub. Date: Mar. 24, 2011

(65) Prior Publication Data
US 2013/0025274 A1    Jan. 31, 2013

(30) Foreign Application Priority Data

Sep. 16, 2009  (DE) .......................... 10 2009 029 509
Jan. 26, 2010  (DE) .......................... 10 2010 001 216

(51) Int. Cl.
*B60T 11/26* (2006.01)

(52) U.S. Cl.
CPC ....................... *B60T 11/26* (2013.01)

(58) Field of Classification Search
CPC ...... B60T 11/26; B60T 17/225; B60T 8/4081
USPC ........................................... 60/585
See application file for complete search history.

(56) References Cited

U.S. PATENT DOCUMENTS 3,744,513 A * 7/1973 Leitenberger ................. 137/255
4,185,750 A * 1/1980 Op den Camp ............... 220/501
(Continued)

FOREIGN PATENT DOCUMENTS

| DE | 28 44 494 | 4/1979 |
|---|---|---|
| DE | 28 34 789 | 2/1980 |

(Continued)

OTHER PUBLICATIONS

German Search Report references for Application No. 10 2010 001 216.5.

(Continued)

*Primary Examiner* — Nathaniel Wiehe
*Assistant Examiner* — Dustin T Nguyen
(74) *Attorney, Agent, or Firm* — RatnerPrestia

(57) ABSTRACT

The invention relates to a reservoir, in particular for hydraulic motor vehicle brake systems, having one or more pressure medium chambers, a filler neck for filling the reservoir with pressure medium and a pressure medium passage, which is connected to the filler neck and has an opening facing the pressure medium chamber. In order to provide a reservoir which reliably prevents the pressure medium from leaking when the vehicle is in extreme positions and which, at the same time, can be produced in a simple and inexpensive manner, the proposal according to the invention is that the pressure medium passage be provided as a lateral channel which extends in the longitudinal direction along the reservoir, starting from the filler neck, and be formed by walls of an upper part and of a lower part of the reservoir.

5 Claims, 3 Drawing Sheets

(56) References Cited

U.S. PATENT DOCUMENTS

| | | | | |
|---|---|---|---|---|
| 4,297,846 | A | * | 11/1981 | Cadeddu .......................... 60/585 |
| 4,355,512 | A | * | 10/1982 | Kubota et al. .................... 60/585 |
| 4,775,856 | A | | 10/1988 | Ochs et al. |
| 5,957,545 | A | * | 9/1999 | Sawada et al. .................... 303/1 |
| 2006/0048848 | A1 | | 3/2006 | Come et al. |
| 2006/0157141 | A1 | * | 7/2006 | von Hayn et al. ............... 141/95 |
| 2008/0256948 | A1 | * | 10/2008 | Sato ................................ 60/585 |

FOREIGN PATENT DOCUMENTS

| | | |
|---|---|---|
| DE | 36 26 333 | 2/1988 |
| DE | 196 25 340 | 1/1998 |
| DE | 197 38 334 | 3/1998 |
| DE | 103 10 170 | 9/2004 |
| FR | 2 841 610 | 1/2004 |
| FR | 2 874 879 | 3/2006 |
| GB | 2 010 426 | 6/1979 |
| GB | 1 584 728 | 2/1981 |

OTHER PUBLICATIONS

International Search Report corresponding to PCT/EP2010/063517, dated Nov. 23, 2010.

* cited by examiner

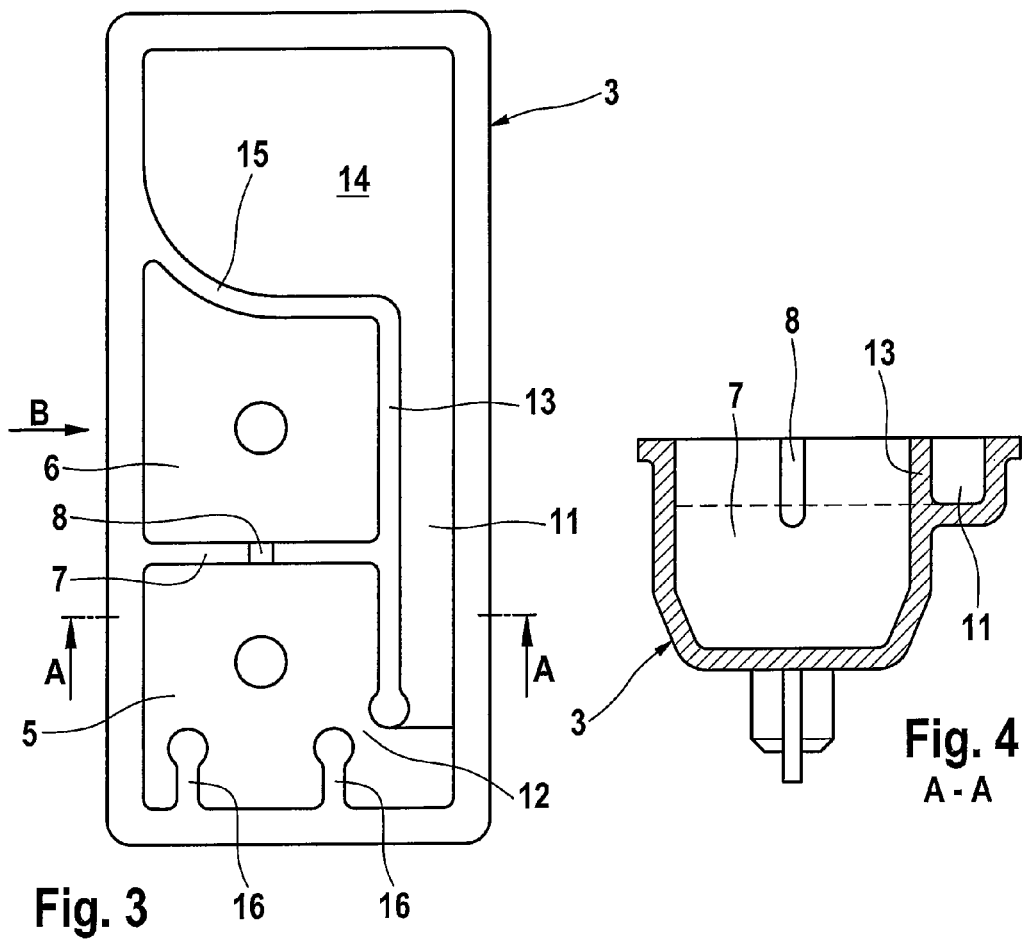
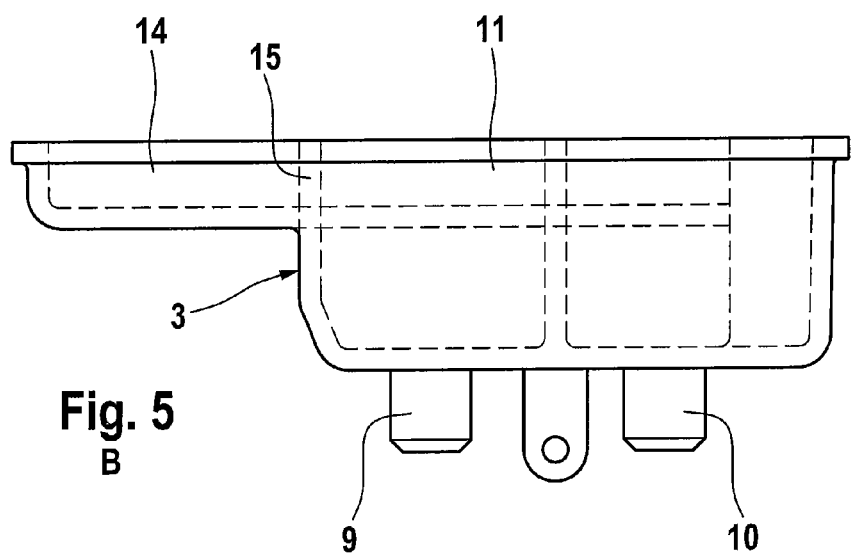

CONTAINER, PARTICULARLY FOR HYDRAULIC VEHICLE BRAKE SYSTEMS

CROSS REFERENCE TO RELATED APPLICATIONS

This application is the U.S. National Phase Application of PCT International Application No. PCT/EP2010/063517, filed Sep. 15, 2010, which claims priority to German Patent Application No. 10 2009 029 509.7, filed Sep. 16, 2009, and German Patent Application No. 10 2010 001 216.5, filed Jan. 26, 2010, the contents of such applications being incorporated by reference herein.

FIELD OF THE INVENTION

The invention relates to a reservoir, in particular for hydraulic motor vehicle brake systems, having one or more pressure medium chambers, a filler neck for filling the reservoir with pressure medium and a pressure medium passage, which is connected to the filler neck and has an opening facing the pressure medium chamber.

BACKGROUND OF THE INVENTION

Owing to modified installation spaces in motor vehicles, pressure medium reservoirs for motor vehicles are increasing in length and/or expensive top-up and brake master cylinder reservoirs (referred to as remote systems with two reservoirs) with hose connections and couplings are required.

The filler neck is normally provided at the very front of the reservoir in the direction of travel since the modified installation spaces or packaging mean that it is only there that the filler neck can be placed. At the same time, however, it is disadvantageous that pressure medium can escape via a closure cap or reservoir cover of the reservoir in various driving states (e.g. braking, hill climbing, cornering).

DE 197 38 334 A1, which is incorporated by reference, has disclosed a reservoir of the type in question which aims to solve this problem. A pressure medium passage is provided in the reservoir and serves to avoid leakage of the pressure medium via the filler neck. For this purpose, the reservoir has a pressure medium passage which is formed integrally in the pressure medium chamber and is provided in one piece with the reservoir. It is regarded as disadvantageous here that the production of the reservoir designed in this way is very involved and is therefore associated with high costs. An alternative illustrative embodiment envisages that the pressure medium passage be formed by a separate component that can be inserted into the reservoir, although the requirement for an additional component is likewise regarded as disadvantageous.

For reasons of cost and installation, there is an increasing need to use long and shallow reservoirs.

SUMMARY OF THE INVENTION

It is therefore an aim of the invention to provide a reservoir of the type in question which reliably prevents the pressure medium from leaking when the vehicle is in extreme positions and which, at the same time, can be produced in a simple and inexpensive manner.

According to aspects of the invention, this is achieved by virtue of the fact that the pressure medium passage is provided as a lateral channel which extends in the longitudinal direction along the reservoir, starting from the filler neck, and is formed by walls of an upper part and of a lower part of the reservoir. The arrangement and design of the lateral channel enables the reservoir to be produced in a simple and inexpensive manner without additional components.

BRIEF DESCRIPTION OF THE DRAWINGS

The invention is best understood from the following detailed description when read in connection with the accompanying drawings. Included in the drawings is the following figures:

FIG. 3 shows a plan view of a lower part of the reservoir shown in FIG. 1;

FIG. 4 shows a cross section through the lower part shown in FIG. 3; and

FIG. 5 shows a side view of the lower part shown in FIG. 3.

DETAILED DESCRIPTION OF THE PREFERRED EMBODIMENTS

Figure 1:
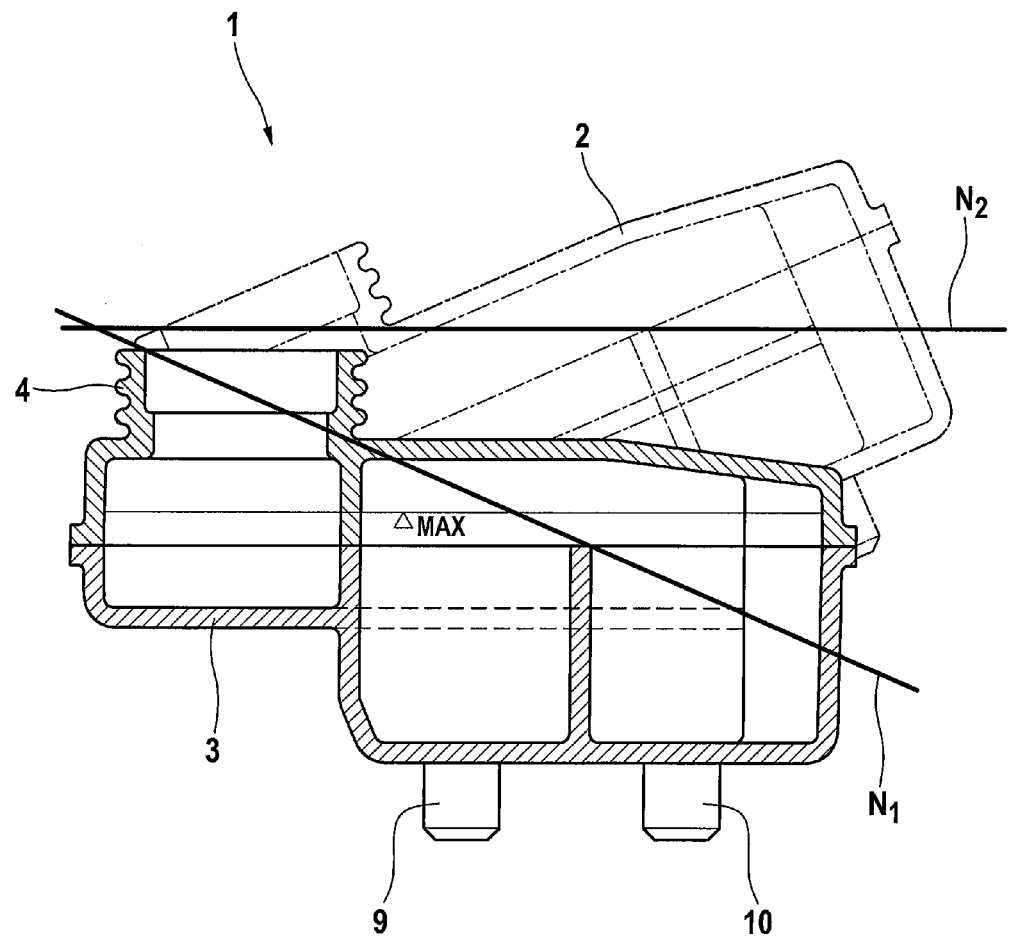
FIG. 1 shows a longitudinal section through a reservoir according to aspects of the invention.
Figure 2:
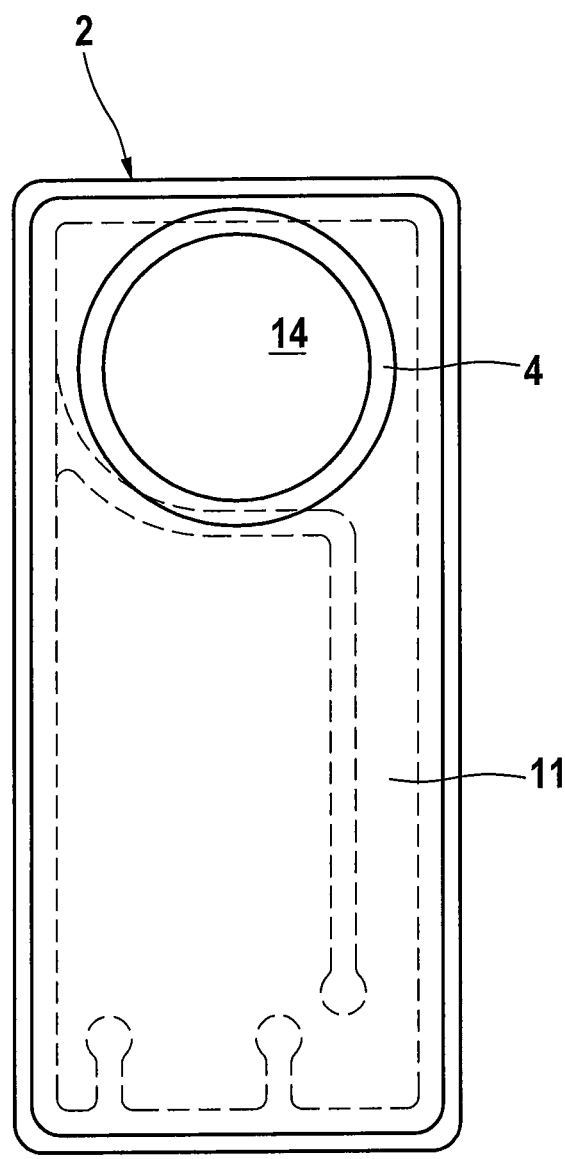
FIG. 2 shows a plan view of an upper part of the reservoir shown in FIG. 1.

FIGS. 1 to 5 show a reservoir 1 according to aspects of the invention for a hydraulic motor vehicle brake system. The fundamental operation and fundamental construction of the reservoir 1 are known. Only the features essential to the invention will therefore be explained below.

The reservoir 1 comprises an upper part 2 and a lower part 3 made of plastic and has at least one pressure medium chamber for supplying pressure medium for the hydraulic motor vehicle brake system, which can be filled with pressure medium via a filler neck 4. A reservoir cover (not shown) closes the filler neck 4, by means of a threaded joint for example.

As is apparent from the plan view of the lower part 3 shown in FIG. 3, two pressure medium chambers 5, 6 are provided in the illustrative embodiment shown, and these supply the pressure medium for pressure chambers of a tandem brake master cylinder (not shown) via fastening lugs 9, 10. The pressure medium chambers 5, 6 are separated from one another by a dividing wall 7, with an opening 8 in the dividing wall 7 ensuring pressure medium compensation and, at the same time, ensuring that there is a legal residual volume in the two pressure medium chambers 5, 6.

For the reservoir 1 to function, it is necessary that the pressure medium chambers 5, 6 should be unpressurized, i.e. that changes in the volume of the pressure medium within the brake system, which may occur due to a loss of pressure medium or due to changes in the temperature of the pressure medium, for example, can be compensated for by an exchange of air. For this purpose, the reservoir cover has means for pressure compensation between the pressure medium chambers 5, 6 and the atmosphere. In extreme positions of the vehicle, e.g. during a braking operation or during a prolonged period in which the vehicle is at an angle when traveling downhill, the means for pressure compensation cannot ensure leaktightness of the reservoir 1, however.

FIG. 1 shows a longitudinal section through the reservoir 1. When the vehicle is stationary, the level of the pressure medium is no more than the max mark. When the vehicle brakes, however, the pressure medium surges in the direction of travel, as indicated by the line $N_1$, and flows over the filler neck 4, thus enabling pressure medium to escape from the reservoir 1. FIG. 1 also indicates a position of the reservoir 1 while traveling downhill. It is apparent that the pressure medium, indicated by the line $N_2$, can escape via the filler neck 4 and the reservoir cover in this case too.

One known way of solving this problem is to provide a pressure medium passage connected to the filler neck in the reservoir, this passage serving to avoid leakage of the pressure medium via the filler neck. For this purpose, the known reservoir has a pressure medium channel which is formed integrally in the pressure medium chamber and is provided in one piece with the reservoir or has a pressure medium channel provided as a separate component that can be inserted into the reservoir.

In order instead to provide a reservoir which reliably prevents the pressure medium from leaking when the vehicle is in extreme positions and which, at the same time, can be produced in a simple and inexpensive manner, the reservoir 1 according to aspects of the invention now has a pressure medium passage 11 connected to the filler neck 4. As is apparent from FIGS. 2 and 3, which show plan views of the upper and lower parts 2, 3, the pressure medium passage 11 is provided as a lateral channel and has an opening 12 facing the pressure medium chamber 5. Moreover, the pressure medium passage 11 extends in the longitudinal direction along the reservoir 1, starting from the filler neck 4, and is formed by walls of the upper and lower parts 2, 3, thus allowing simple production through simple demolding of the two reservoir parts 2, 3.

FIGS. 4 and 5 show additional views of the lower part 3. FIG. 4 shows a cross section in plane A-A through the lower part 3 shown in FIG. 3. Particularly from this figure, it is possible to see that the channel 11 is arranged laterally offset with respect to the pressure medium chambers 5, 6, with the result that an outer wall 13 of the lower part 3 forms an inner wall of the channel 11. A corresponding design is provided for the upper part 2 and therefore the channel 11 is fully formed once the upper and lower parts 2, 3 have been joined together, e.g. by ultrasonic welding.

FIG. 5 shows a side view of the lower part 3 from the direction B indicated in FIG. 3. It is apparent from this and from FIG. 1 that the filler neck 4 is also provided in such a way as to be arranged offset with respect to the pressure medium chambers 5, 6. In contrast to the pressure medium passage 11, however, the filler neck 4 is offset in the longitudinal direction.

A region 14 below the filler neck 4, said region being divided off by an inner wall 15, forms the start of the channel 11, thus ensuring that the introduction of pressure medium via the filler neck 4 is not hindered by a constriction in this region.

Inner walls 16 for stabilizing the reservoir 1 are furthermore provided in the region of the pressure medium chamber 5.

LIST OF REFERENCE SIGNS 1 reservoir
2 upper part
3 lower part
4 filler neck
5 pressure medium chamber
6 pressure medium chamber
7 dividing wall
8 opening
9 fastening lug
10 fastening lug
11 pressure medium passage
12 opening
13 outer wall
14 region
15 inner wall
16 inner wall

The invention claimed is:

1. A reservoir for hydraulic motor vehicle brake systems, comprising:
a plurality of pressure medium chambers, each chamber comprising an opening in a lower surface thereof configured for connection with a brake master cylinder,
a filler neck for filling the reservoir with a pressure medium,
a pressure medium passage, which is connected to the filler neck and has an opening facing one of the plurality of pressure medium chambers, and
a dividing wall positioned between two of the pressure medium chambers, the dividing wall having a dividing wall opening connecting the two of the pressure medium chambers,
wherein the pressure medium passage is provided as a lateral channel which extends in a longitudinal direction along the reservoir, starting from the filler neck, and is formed by walls of an upper part and of a lower part of the reservoir, and
wherein the dividing wall opening extends to a depth greater than a depth of the pressure medium passage.

2. The reservoir as claimed in claim 1, wherein the channel is provided in such a way as to be arranged laterally offset with respect to the pressure medium chambers.

3. The reservoir as claimed in claim 2, wherein an outer wall of the lower part forms an inner wall of the channel.

4. The reservoir as claimed in claim 1, wherein the filler neck is provided in such a way as to be arranged offset in a longitudinal direction with respect to the pressure medium chambers, and a start of the channel is formed below the filler neck.

5. The reservoir as claimed in claim 1, wherein inner walls are provided to stabilize the reservoir.

* * * * *